United States Patent
Yoon et al.

(10) Patent No.: US 9,322,442 B2
(45) Date of Patent: Apr. 26, 2016

(54) METHOD OF CORRECTING CLUTCH CHARACTERISTICS OF VEHICLE

(71) Applicants: Hyundai Motor Company, Seoul (KR); Kia Motors Corp., Seoul (KR)

(72) Inventors: Young Min Yoon, Seoul (KR); Ho Young Lee, Bucheon-si (KR); Joung Chul Kim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 69 days.

(21) Appl. No.: 14/461,189

(22) Filed: Aug. 15, 2014

(65) Prior Publication Data

US 2015/0167756 A1 Jun. 18, 2015

(30) Foreign Application Priority Data

Dec. 18, 2013 (KR) .......................... 10-2013-0157845

(51) Int. Cl.
- *F16D 48/06* (2006.01)
- *B60W 10/02* (2006.01)
- *B60W 10/04* (2006.01)

(52) U.S. Cl.
CPC ............... *F16D 48/06* (2013.01); *B60W 10/02* (2013.01); *B60W 10/04* (2013.01); *F16D 48/062* (2013.01); *B60W 2510/0291* (2013.01); *F16D 2500/30401* (2013.01); *F16D 2500/30404* (2013.01); *F16D 2500/3168* (2013.01); *F16D 2500/50236* (2013.01); *Y10T 477/6395* (2015.01); *Y10T 477/653* (2015.01)

(58) Field of Classification Search
CPC .................. F16D 48/06; F16D 48/062; F16D 2500/30404; B60W 10/02; B60W 2510/0291; Y10T 477/6395; Y10T 477/653
USPC .................................... 701/65, 68; 477/76, 98
See application file for complete search history.

(56) References Cited

U.S. PATENT DOCUMENTS

| | | | | |
|---|---|---|---|---|
| 5,307,269 | A * | 4/1994 | Kohno | F16D 48/066 192/82 T |
| 6,341,679 | B1 * | 1/2002 | Abe | F16H 61/143 192/3.29 |
| 2003/0134713 | A1 * | 7/2003 | Senger | F16D 48/066 477/174 |
| 2015/0167754 | A1 * | 6/2015 | Lee | F16D 48/06 701/68 |

FOREIGN PATENT DOCUMENTS

| | | | |
|---|---|---|---|
| JP | 02159420 A | * | 6/1990 |
| JP | 2004-293744 A | | 10/2004 |
| JP | 2008-180391 A | | 8/2008 |
| KR | 10-2009-0062622 A | | 6/2009 |
| KR | 10-2011-0031416 A | | 3/2011 |
| WO | WO 2008/096438 A1 | | 8/2008 |

\* cited by examiner

*Primary Examiner* — Roger Pang
(74) *Attorney, Agent, or Firm* — Morgan, Lewis & Bockius LLP

(57) ABSTRACT

A method of correcting clutch characteristics of a vehicle may include determining whether or not a difference in temperature between a surface and a core of a driving clutch exceeds a reference value, and correcting a torque-stroke (T-S) curve if it is determined that the difference in temperature exceeds the reference value. The correcting of the T-S curve may include moving the T-S curve from a currently selected position in a direction in response to a rise in temperature.

5 Claims, 3 Drawing Sheets

METHOD OF CORRECTING CLUTCH CHARACTERISTICS OF VEHICLE

CROSS-REFERENCE(S) TO RELATED APPLICATION

The present application claims priority of Korean Patent Application Number 10-2013-0157845 filed on Dec. 18, 2013, the entire contents of which application are incorporated herein for all purposes by this reference.

BACKGROUND OF INVENTION

1. Field of Invention

The present invention relates to a method of correcting clutch characteristics of a vehicle, and more particularly, to a technology for correcting variation characteristics of the transmission torque of a clutch depending on the stroke of an actuator considering the difference in temperature between the surface and the core part of the clutch.

2. Description of Related Art

Semi-automatic transmissions, such as automated manual transmissions (AMTs) and double clutch transmissions (DCTs), are systems which automatically control a manual transmission mechanism. Unlike typical automatic transmissions (ATs) which use a torque converter and a wet multi-plate clutch, semi-automatic transmissions are frequently configured such that they use a dry clutch to transmit engine torque to a transmission mechanism.

The dry clutch is controlled by an actuator. In general, the actuator is controlled based on a torque-stroke (T-S) curve that presents variations in the transmission torque of the dry clutch with respect to the stroke of the actuator.

The dry clutch is characterized in that the transmission torque thereof significantly varies depending on a variety of factors, such as a single part tolerance of each component, a degree of wear due to the progression of duration, thermal deformation at high temperature and a variation in the coefficient of friction of a disk. It is difficult to convert the transmission torque of the dry clutch into a preset form of data.

However, the dry clutch fails to properly reflect variations in the characteristics of the transmission torque when controlling the actuator. When the actuator is controlled insufficiently or excessively, the dry clutch may slip excessively or be subjected to an impact. There is required a technique for accurately finding transmission torque characteristics of the dry clutch depending on the actuator stroke so as to be used in control over the actuator.

FIGS. 1 and 2 are graphs showing variations in a T-S curve depending on changes in temperature of two clutches, i.e. a first clutch and a second clutch, which are used in a DCT. Here, FIG. 1 shows the transmission torque characteristics of the first clutch. Referring to the graph of the first clutch in FIG. 1, the T-S curve moves to the right depending on a rise in the temperature, leading to a situation in which more actuator strokes are required in order to produce the same clutch transmission torque. At a preset temperature or higher, the T-S curve moves to the left, leading to a situation in which the same clutch transmission torque can be produced from fewer actuator stroke.

FIG. 2 shows the transmission torque characteristics of a second clutch. Referring to FIG. 2, the T-S curve tends to move to the left depending on a rise in the temperature. It can be estimated that the different transmission torque characteristics of the first clutch and the second clutch are caused by the positions and shapes of respective clutches.

In the control over the clutch using the T-S curve as described above, a representative temperature value is estimated on the assumption that the temperature of the clutch is uniform over the entire clutch, a T-S curve is selected based on the estimated representative temperature value, and thus an actuator stroke for producing an intended clutch transmission torque is determined.

However, in fact, the temperature of the surface of the clutch practically differs from the temperature of the core of the clutch. When heat is heavily generated due to the slipping of the clutch since a gear-changing time is prolonged as in kick-down gear change, the difference in the temperature between the surface and the core of the clutch is significantly increased. If the T-S curve is selected based on one representative temperature value as above by disregarding such a difference and the actuator stroke is determined using the T-S curve, an intended clutch transmission torque is not produced. This improper situation causes the clutch to excessively slip or be impacted.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a method of correcting clutch characteristics of a vehicle that can correct a T-S curve depending on the characteristics of individual clutches when the difference in temperature between the surface and the core part of the clutch is greater than a reference value. Even in the situation in which the difference in temperature between the surface and the core part of the clutch is significant, it is possible to more properly control the clutch, thereby improving the endurance of the clutch, preventing the clutch from being impacted, and significantly contributing to an improvement in the value of the vehicle.

According to various aspects of the present invention, there is provided a method of correcting clutch characteristics of a vehicle. The method includes the following steps of: determining whether or not a difference in temperature between a surface and a core of a driving clutch exceeds a reference value, and correcting a torque-stroke (T-S) curve if it is determined that the difference in temperature exceeds the reference value, wherein the correcting of the T-S curve comprises moving the T-S curve from a currently selected position in a direction in response to a rise in temperature.

As set forth above, the present invention is intended to correct transmission torque characteristics of the clutch by reflecting a significant difference in the temperature between the surface and the core of the clutch. It is possible to more properly control the clutch, thereby improving the endurance of the clutch, preventing the clutch from being impacted, and significantly contributing to an improvement in the value of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
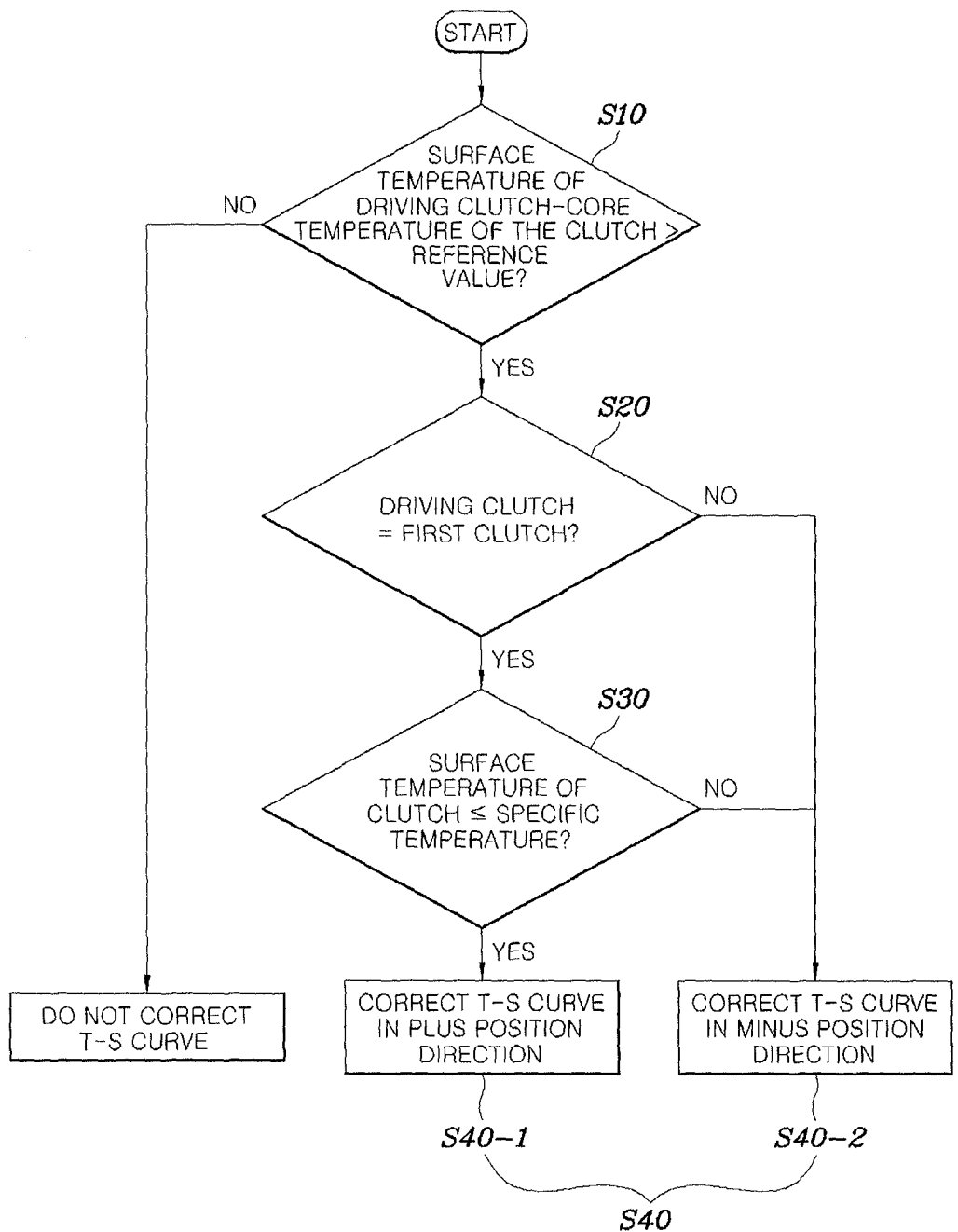
FIG. 3 is a flowchart showing an exemplary method of correcting clutch characteristics of a vehicle according to the present invention.

Referring to FIG. 3, a method of correcting clutch characteristics of a vehicle according to various embodiments of the present invention includes: temperature difference determination step S10 of determining whether or not the difference in temperature between the surface and the core part of a driving clutch exceeds a reference value; and curve correction step S40 of correcting a T-S curve if the temperature difference exceeds the reference value as the result of the temperature difference determination step S10.

If the difference in temperature between the surface and the core part of the clutch may cause a problem when the currently-set T-S curve is used as it is, the T-S curve is corrected considering the temperature difference at the curve correction step S40 in order to improve the endurance of the clutch and prevent the clutch from being impacted through more suitable clutch control.

Accordingly, the reference value is set to a value that can indicate that the difference in the temperature between the surface and the core of the clutch is at such a level that a problem may occur when the currently-set T-S curve is used as it is. This value can be determined through a plurality of experiments and/or analyses. For reference, the temperatures of the surface and the core of the clutch can be values that are calculated by individual temperature models.

The curve correction step S40 includes correcting the temperature by moving the T-S curve from the currently-selected position of the T-S curve in the direction in which the curve moves as the temperature rises. Specifically, in a typical semi-automated transmission having one clutch, it is possible to correct clutch characteristics by moving the T-S curve in the direction in which the T-S curve moves depending on the temperature of the clutch. When the clutch consists of two clutches (a first clutch and a second clutch) as in a DCT, the curve correction step S40 is carried out differently depending on whether a driving clutch to which a currently-operating gear is connected is the first clutch or the second clutch after carrying out the temperature difference determination step S10.

Figure 1:
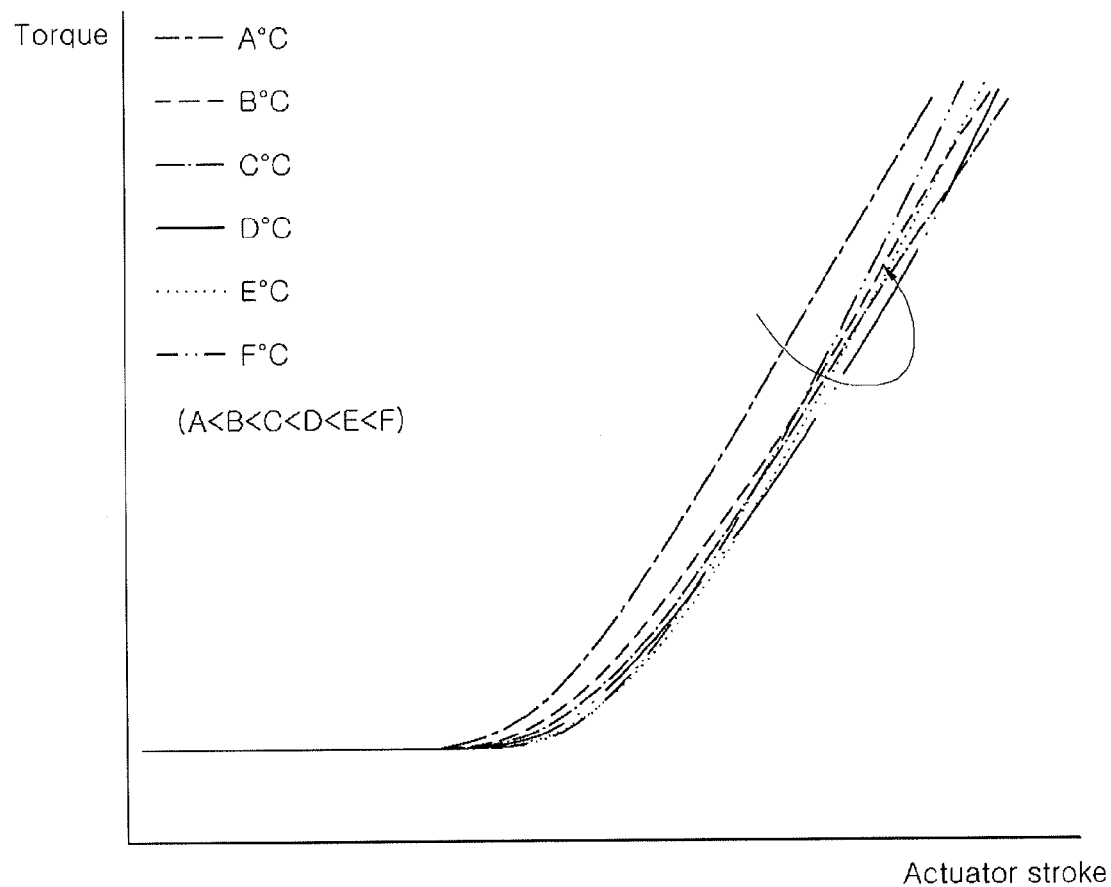
FIG. 1 is a graph showing variations in a T-S curve depending on the temperature of a first clutch of a DCT.

The curve correction step S40 and/or other additional/optional steps are suitable, for example, for cases in which the movement characteristics of the T-S curve of the first clutch differ from the movement characteristics of the T-S curve of the second clutch. For example, as shown in FIG. 1, the first clutch is characterized in that the T-S curve moves in the direction in which the stroke of the actuator increases at the same transmission torque in response to the rise in the temperature at or below a specific temperature. Above the specific temperature, the T-S curve moves in the direction in which the stroke decreases at the same transmission torque in response to the rise in the temperature.

In this case, the method of the present invention additionally or optionally includes: clutch determination step S20 of determining whether the driving clutch to which the gear is currently connected is the first clutch when the temperature difference exceeds the reference value as the result of the temperature difference determination step S10; surface temperature determination step S30 of determining whether the temperature of the surface of the clutch is equal to or lower than the specific temperature when the clutch to which the gear is currently connected is the first clutch as the result of the clutch determination step S20; plus correction step S40-1 of correcting the T-S curve by moving the T-S curve in the direction in which the stroke increases when the temperature of the surface is equal to or lower than the specific temperature as the result of the temperature of the surface determination step S30; and minus correction step S40-2 of correcting the T-S curve by moving the T-S curve in the direction in which the stroke decreases when the temperature of the surface exceeds the specific temperature as the result of the surface temperature determination step S30.

Figure 2:
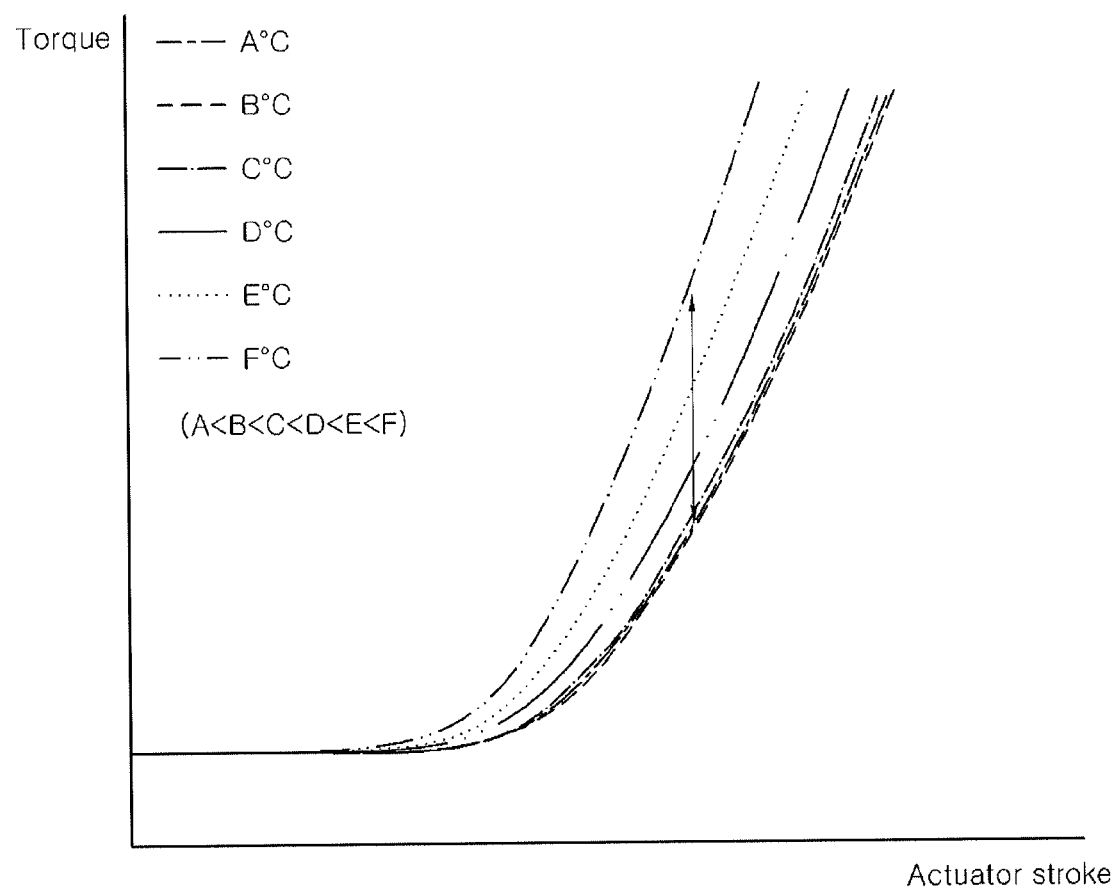
FIG. 2 is a graph showing variations in a T-S curve depending on the temperature of a second clutch of a DCT.

In addition, when the second clutch is characterized in that the T-S curve moves in the direction in which the actuator stroke decreases at the same transmission torque in response to the rise in the temperature as shown in FIG. 2, the method of the present invention additionally or optionally includes: clutch determination step S20 of determining whether or not the driving clutch to which the gear is currently connected is the first clutch when the temperature difference exceeds the reference value as the result of the temperature difference determination step S10; and minus correction step S40-2 of correcting the T-S curve by moving the T-S curve in the direction in which the stroke decreases when the clutch to which the gear is currently connected is not the first clutch as the result of the clutch determination step S20.

Accordingly, when the difference in temperature between the surface and the core part of the clutch is greater than the reference value, it is possible to correct the T-S curve depending on the characteristics of individual clutches. Even in the situation in which the difference in temperature between the surface and the core part of each clutch is significant, it is possible to properly control the clutch, thereby improving the endurance of the clutch and preventing the clutch from being impacted. These advantages significantly contribute to an improvement in the value of a vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of correcting clutch characteristics of a vehicle, comprising:
   determining whether or not a difference in temperature between a surface and a core of a driving clutch exceeds a reference value; and
   correcting a torque-stroke (T-S) curve if it is determined that the difference in temperature exceeds the reference value,
   wherein the correcting of the T-S curve comprises moving the T-S curve from a currently selected position in a direction in response to a rise in temperature.

2. The method according to claim 1, wherein the correcting of the T-S curve is carried out differently depending on whether the driving clutch, to which a currently-operating gear is connected, is either a first clutch or a second clutch in a clutch transmission.

3. The method according to claim 2, wherein the first clutch is characterized in that the T-S curve of the first clutch moves in a direction in which a stroke of an actuator increases while maintaining a torque the same in response to the rise in temperature when a surface temperature of the first clutch is at or below a predetermined temperature and moves in a direction in which the stroke decreases while maintaining a torque the same in response to the rise in temperature when the surface temperature of the first clutch is above the predetermined temperature, the method further comprising:
   determining whether the driving clutch to which the gear is currently connected is the first clutch after it is determined that the difference in temperature exceeds the reference value;
   determining whether the temperature of the surface of the driving clutch is equal to or lower than the predetermined temperature if it is determined that the driving clutch is the first clutch;
   correcting the T-S curve by moving the T-S curve in the direction in which the stroke increases if it is determined that the temperature of the surface of the driving clutch is equal to or lower than the predetermined temperature; and
   correcting the T-S curve by moving the T-S curve in the direction in which the stroke decreases if it is determined that the temperature of the surface of the driving clutch exceeds the predetermined temperature.

4. The method according to claim 3, wherein the second clutch is characterized in that the T-S curve of the second clutch moves in a direction in which the stroke of the actuator decreases while maintaining a torque the same in response to the rise in temperature, the method further comprising:
   correcting the T-S curve by moving the T-S curve in the direction in which the stroke decreases if it is determined that the driving clutch to which the gear is currently connected is not the first clutch.

5. The method according to claim 2, wherein the second clutch is characterized in that the T-S curve of the second clutch moves in a direction in which the stroke of the actuator decreases while maintaining a torque the same in response to the rise in temperature, the method further comprising:
   determining whether or not the driving clutch to which the gear is currently connected is the first clutch after it is determined that the difference in temperature exceeds the reference value; and
   correcting the T-S curve by moving the T-S curve in the direction in which the stroke decreases if it is determined that the driving clutch to which the gear is currently connected is not the first clutch.

* * * * *